(12) United States Patent
Rhyu et al.

(10) Patent No.: US 11,139,729 B2
(45) Date of Patent: Oct. 5, 2021

(54) MAGNETIC COUPLING

(71) Applicant: Korea Electronics Technology Institute, Seongnam-si (KR)

(72) Inventors: Sehyun Rhyu, Bucheon-si (KR); Jungmoo Seo, Goyang-si (KR); Jeongjong Lee, Incheon (KR); Kideok Lee, Seoul (KR); Raeeun Kim, Seoul (KR); Myunghwan Yoon, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 75 days.

(21) Appl. No.: 16/657,004

(22) Filed: Oct. 18, 2019

(65) Prior Publication Data

US 2020/0343805 A1    Oct. 29, 2020

(30) Foreign Application Priority Data

Apr. 26, 2019    (KR) .......................... 10-2019-0048954

(51) Int. Cl.
*H02K 49/10*    (2006.01)
*H02K 1/27*    (2006.01)

(52) U.S. Cl.
CPC .................................. *H02K 49/106* (2013.01)

(58) Field of Classification Search
CPC ............................... H02K 49/106; H02K 1/27
USPC .................... 310/46, 103, 115, 16.36, 156.36
See application file for complete search history.

(56) References Cited

FOREIGN PATENT DOCUMENTS

| JP | 5-168222 A | 7/1993 | |
|---|---|---|---|
| JP | 2014100027 A | * 5/2014 | ........... H02K 49/102 |
| KR | 10-1501549 B1 | 3/2015 | |
| KR | 10-1846343 B1 | 5/2018 | |

OTHER PUBLICATIONS

Machine translation JP201400027 (Year: 2014).*
Korean Office Action dated Mar. 17, 2021 in Courterpart Korean Patent Application No. 10-2019-0048954 (Seven pages in Korean).

* cited by examiner

*Primary Examiner* — Jose A Gonzalez Quinones
(74) *Attorney, Agent, or Firm* — NSIP Law

(57) ABSTRACT

The present disclosure provides a magnetic coupling that can be manufactured to meet various specification requirements by employing magnets which can be shared between the magnetic couplings. Magnet insertion recesses are formed in a two-dimensional arrays having a plurality of rows and a plurality of columns in an area where the magnets are to be is installed, the magnets are inserted selectively into the magnet insertion recesses according to the specification requirements.

9 Claims, 8 Drawing Sheets

MAGNETIC COUPLING

CROSS-REFERENCE TO RELATED APPLICATION

The present application claims priority to Korean Patent Application No. 10-2019-0048954, filed on Apr. 26, 2019, in the Korean Intellectual Property Office, which is incorporated herein in its entirety by reference.

TECHNICAL FIELD

The present disclosure relates to a magnetic coupling and, more particularly, to a magnetic coupling that can meet any of various specification requirements by employing magnets of the same shape.

BACKGROUND

A coupling is shaft joint device which may be installed in a power transmission apparatus such as an industrial machine and an automation equipment to connect a drive shaft to a driven shaft to transfer torque with little deviation in rotation speeds between the drive shaft and the driven shaft.

Conventional couplings include a gear coupling such as a spline, a diaphragm coupling, a flexible coupling, a magnetic coupling, and the like. Among the various couplings, the magnetic coupling connects physically separated shafts by using magnetic forces to transfer the torque between the shafts. Since the magnetic coupling allows a complete isolation of the axes, it is widely being used in applications which require sealing between the axes.

The magnetic coupling is made using magnets of different shapes and dimensions suited for each power transmission apparatus to meet various specification requirements of the power transmission apparatuses. As the magnetic coupling and the magnets are manufactured according to the specification of the power transmission apparatus, it is difficult to share the magnets between the magnetic couplings having different specifications, which increases the manufacturing costs of the magnetic couplings.

PRIOR ART REFERENCE

Patent Literature

Korean Patent Publication No. 10-1501549 published on Mar. 12, 2015

SUMMARY

In order to solve the above problems, the present disclosure provides a magnetic coupling that can be manufactured to meet various specification requirements of the power transmission apparatuses by employing magnets which can be shared between the magnetic couplings. In particular, the present disclosure provides a magnetic coupling that can be manufactured to meet various specification requirements of the power transmission apparatuses by using the magnets of the same shape.

Additional aspects will be set forth in part in the description which follows and, in part, will be apparent from the description, or may be learned by practice of the presented exemplary embodiments.

According to an aspect of an exemplary embodiment, provided is an inner rotor for use in a magnetic coupling. The inner rotor includes: an inner rotor core having inner magnet insertion recesses formed in a two-dimensional array having m rows and n columns on an entire outer circumferential surface, where m and n are natural numbers larger than 3 and n is larger than m; an inner rotation shaft coupled to a center of an end face of the inner rotor core; and a plurality of inner magnets magnetized in a radial direction and each being installed in respective one of at least some of the inner magnet insertion recesses such that a magnetic north (N) pole of one or more of the plurality of inner magnets alternates with a magnetic south (S) pole of one or more of the plurality of inner magnets.

Each of the inner magnet insertion recesses may have rectangular cross sections in longitudinal and transverse directions.

The inner magnet insertion recesses in a column may be arranged in a direction parallel to a rotational axis of the inner rotor, and the inner magnet insertion recesses in a row may be arranged in a circumference of which plane is orthogonal with respect to the rotational axis of the inner rotor.

The inner magnet insertion recesses arranged in a column may be provided with the inner magnets of a same polarity.

According to an aspect of another exemplary embodiment, provided is an outer rotor for use in a magnetic coupling. The outer rotor includes: an outer rotor core having a cavity for receiving an inner rotor and outer magnet insertion recesses formed in a two-dimensional array having x rows and y columns on an entire inner circumferential surface, where x and y are natural numbers larger than 3 and y is larger than x; an outer rotation shaft coupled to the outer rotor core and extending axially in a direction opposite to the cavity; and a plurality of outer magnets magnetized in a radial direction and each being installed in respective one of at least some of the outer magnet insertion recesses such that the N pole of one or more of the plurality of outer magnets alternates with the S pole of one or more of the plurality of outer magnets.

The outer magnet insertion recesses in a column may be arranged in a direction parallel to a rotational axis of the outer rotor, and the outer magnet insertion recesses in a row may be arranged in a circumference of which plane is orthogonal with respect to the rotational axis of the outer rotor.

The outer magnet insertion recesses arranged in a column may be provided with the outer magnets of a same polarity.

According to an aspect of another exemplary embodiment, provided is a magnetic coupling. The magnetic coupling includes: an outer rotor having a cavity for receiving an inner rotor and an inner circumferential surface on which a plurality outer magnets are installed; and the inner rotor placed in the cavity of the outer rotor and having an outer circumferential surface on which a plurality inner magnets are installed.

The present disclosure enables to provide a magnetic coupling that can meet various specification requirements by magnets of the same shape and dimension. In other words, the magnetic coupling can meet various specification requirements by forming the magnet insertion recesses in a two-dimensional arrays having a plurality of rows and a plurality of columns in an area where the magnets are to be installed and inserting the magnets selectively into the magnet insertion recesses according to the specification requirements.

Since the magnets inserted into the magnet insertion recesses have the same shape, the magnets can be shared between the magnetic couplings having different specifications from each other.

Also, the specification of the magnetic coupling may be adjusted further by changing the width and length of the magnets inserted into the magnet insertion recesses. Thus, the magnetic coupling of more various specifications can be manufactured easily by adjusting the number of the magnets inserted into the magnet insertion recesses as well as the shape of the magnets.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

In the following description and the accompanied drawings, only parts necessary for understanding embodiments of the present disclosure will be described, and the descriptions of well-known functions or configurations that may obscure the subject matter of the present disclosure will be omitted for simplicity.

The terms and words used in the following description and appended claims are not necessarily to be construed in an ordinary sense or a dictionary meaning, and may be appropriately defined herein to be used as terms for describing the present disclosure in the best way possible. Such terms and words should be construed as meaning and concept consistent with the technical idea of the present disclosure. The embodiments described in this specification and the configurations shown in the drawings are merely preferred embodiments of the present disclosure and are not intended to limit the technical idea of the present disclosure. Therefore, it should be understood that there may exist various equivalents and modifications which may substitute the exemplary embodiments at the time of filing of the present application.

Figure 1:
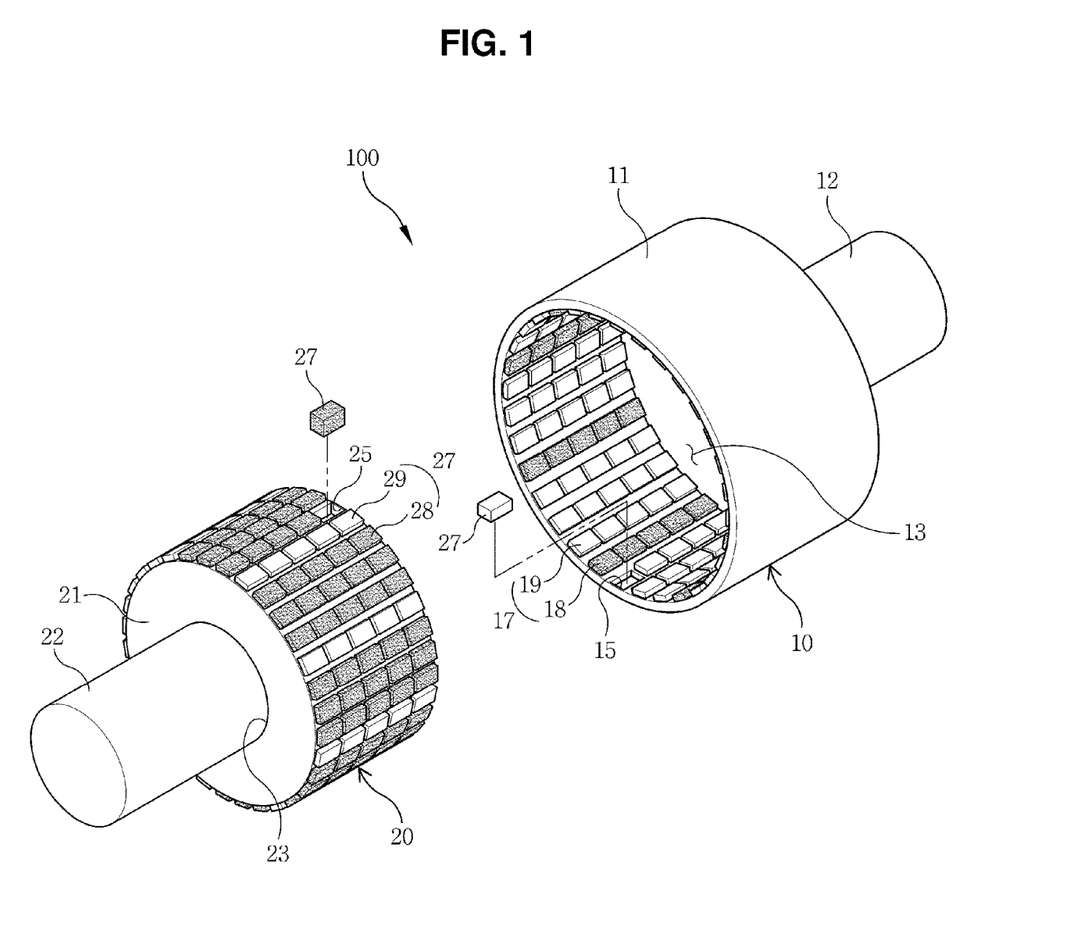
FIG. 1 is an exploded view of a magnetic coupling according to an exemplary embodiment of the present disclosure.
Figure 2:
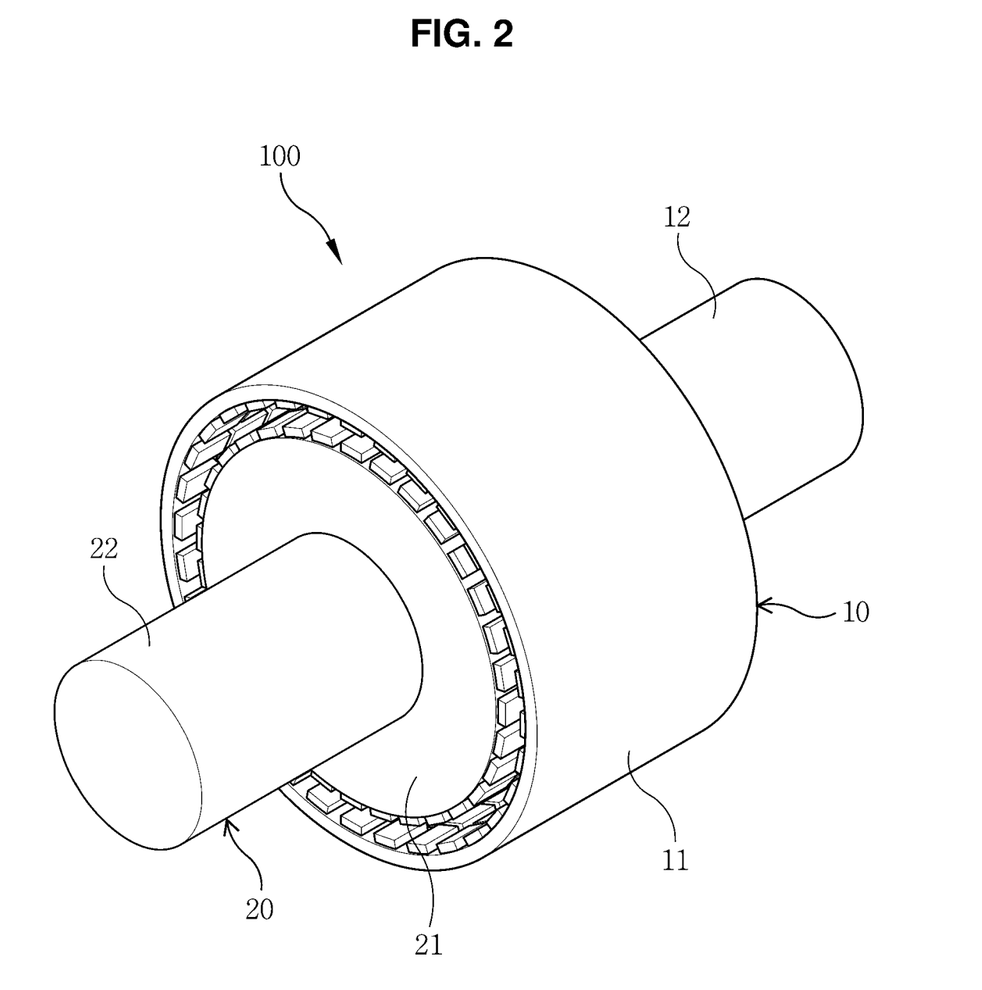
FIG. 2 is a perspective view of the magnetic coupling according to an exemplary embodiment of the present disclosure in an assembled state.

FIG. 1 is an exploded view of a magnetic coupling according to an exemplary embodiment of the present disclosure, and FIG. 2 is a perspective view of the magnetic coupling in an assembled state.

Referring to FIGS. 1 and 2, the magnetic coupling 100 according to the present embodiment includes an outer rotor 10 and an inner rotor 20. The outer rotor 10 has a shape of a cylinder of which one end is closed to form a cavity 13, into which the inner rotor 20 is inserted. A plurality of outer magnets 17 may be disposed on an inner circumferential surface of the cavity 13 of the outer rotor 10. The inner rotor 20 is inserted into the cavity 13 of the outer rotor 10, and a plurality of inner magnets 27 may be disposed on an outer circumferential surface of the inner rotor 20. Each of the outer magnets 17 and the inner magnets 27 is installed to be located close to, but spaced apart from, corresponding one of the inner magnets 27 and the outer magnets 17. The outer rotor 10 and the inner rotor 20 have an outer rotation shaft 12 and an inner rotation shaft 22, respectively, separated physically from each other and extending in opposite directions on a same virtual axis. The outer rotation shaft 12 and the inner rotation shaft 22 connected by magnetic forces between the outer magnets 17 and the inner magnets 27 to transfer a rotational torque.

Magnet insertion recesses 15 or 25 may be formed on the inner circumferential surface of the outer rotor 10 or the outer circumferential surface of the inner rotor 20, respectively. The outer magnet insertion recesses 15 may be formed on an entire inner circumferential surface of the outer rotor 10, and the inner magnet insertion recesses 25 may be formed on an entire outer circumferential surface of the inner rotor 20. All or some of the outer and inner magnet insertion recesses 15 or 25 are inserted with magnets 17 or 27 according to the specification required for the magnetic coupling 100 to be manufactured. Thus, some of the magnet insertion recesses 15 and 25 may be left empty without the magnets 17 and 27 being inserted.

The magnet insertion recesses 15 and 25 are formed in a two-dimensional array consisting of a plurality of rows and columns. The magnets 17 and 27 may be inserted into the magnet insertion recesses 15 and 25. The specification required for the magnetic coupling 100 can be met by adjusting the length or width of the magnets 17 and 27 inserted into the magnet insertion recesses 15 and 25.

In addition, according to the present disclosure, the specification required for the magnetic coupling 100 can be met by adjusting the number of the magnets 17 and 27 inserted into the magnet insertion recesses 15 and 25. Accordingly, the magnet coupling 100 according to the present embodiment can met the specification required for the power transmission apparatus by using the magnets 17 and 27 having the same shape. That is, the magnetic coupling 100 that meets a certain specification requirement can be provided by inserting as many magnets 17 and 27 as necessary according to the specification requirement into the plurality of magnet insertion recesses 15 and 25 formed in the outer rotor 10 and the inner rotor 20.

Since the magnets 17 and 27 inserted into the magnet insertion recesses 15 and 25 have the same shape, the magnets 17 and 27 can be shared between the magnetic couplings 100 having different specification requirements.

Also, the specification of the magnetic coupling 100 may be adjusted further by changing the width and length of the magnets 17 and 27 inserted into the magnet insertion recesses 15 and 25. Thus, the magnetic coupling 100 of more various specifications can be manufactured easily by adjusting the number of the magnets 17 and 27 inserted into the magnet insertion recesses 15 and 25 as well as the shape of the magnets 17 and 27.

As mentioned above, the magnet insertion recesses 15 and 25 into which the magnets 17 and 27 can be inserted are formed in the outer rotor 10 and the inner rotor 20, respectively, according to the present embodiment. The outer rotor 10 and the inner rotor 20 according to the present embodiment will be described in more detail with reference to FIGS. 3-8.

Figure 3:
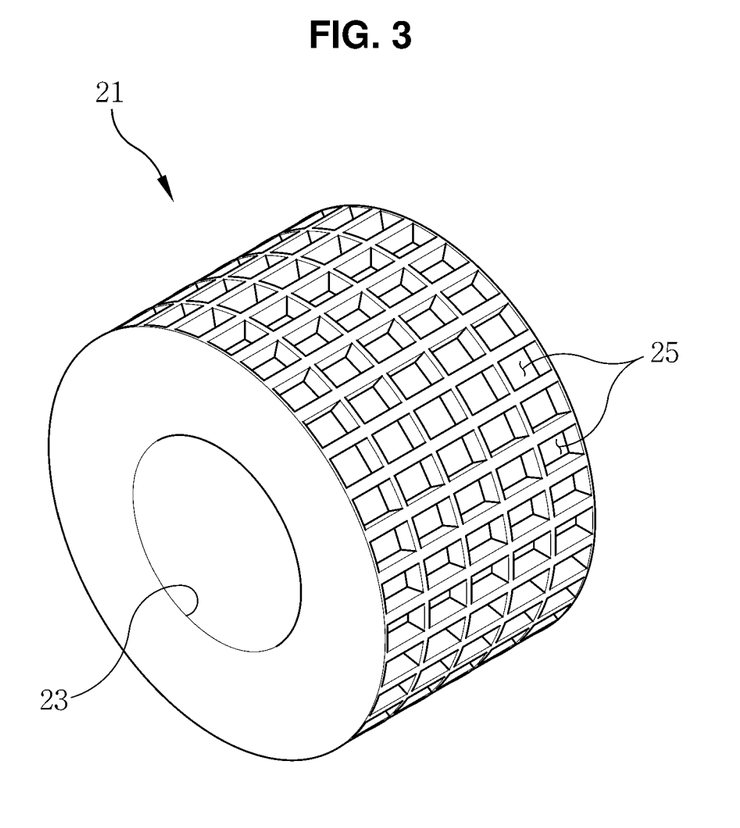
FIG. 3 is a perspective view of an inner rotor core of an inner rotor shown in FIG.
Figure 4:
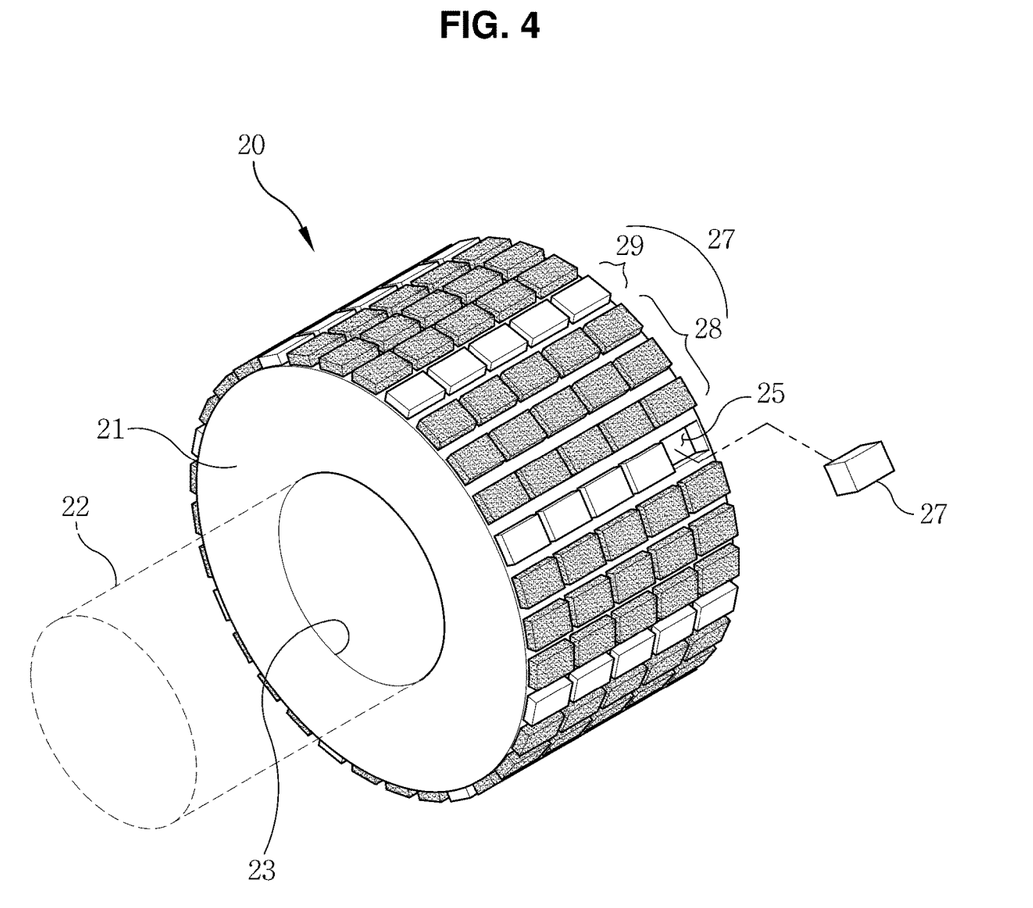
FIG. 4 is a perspective view of the inner rotor shown in FIG. 1.

First, the inner rotor 20 according to the present embodiment will be described with reference to FIGS. 1-4. FIG. 3 is a perspective view of an inner rotor core 21 of the inner rotor 20. FIG. 4 is a perspective view of the inner rotor 20 shown in FIG. 1.

The inner rotor 20 includes the inner rotor core 21, the inner rotation shaft 22, and the plurality of inner magnets 27. The inner rotor core 21 has the inner magnet insertion recesses 25 formed in the two-dimensional array having m rows and n columns, where m and n are natural numbers larger than 3 and n is larger than m, on its entire outer circumferential surface. The inner rotation shaft 22 may be coupled to the inner rotor core 21 to extend from a center of an end face of the inner rotor core 21. The plurality of inner magnets 27 are installed in at least some of the inner magnet insertion recesses 25. In particular, the inner magnets 27 may be installed such that a magnetic north (N) pole of one or a plurality of inner magnets 27 alternates with a magnetic south (S) pole of one or a plurality of inner magnets 27 on the outer circumferential surface of the inner rotor 20.

The inner rotor core 21 has a cylindrical shape, and a shaft insertion hole 23 may be formed to penetrate the centers of the planar sides of the inner rotor core 21 along its rotational axis so that the inner rotation shaft 22 is inserted into the shaft insertion hole 23. The inner magnet insertion recesses 25 formed on the entire outer circumferential surface may have rectangular cross sections in longitudinal and transverse directions, for example.

The inner magnet insertion recesses 25 in a column are arranged in a direction parallel to the rotational axis of the inner rotor 20. The inner magnet insertion recesses 25 in a row are arranged in a circumference of which plane is orthogonal with respect to the rotational axis of the inner rotor 20.

The inner magnets 27 are magnetized in a radial direction. Some of the inner magnets 27 may be disposed such that their N poles are exposed to the outer circumferential surface of the inner rotor core 21, while the other inner magnets 27 may be disposed such that their S poles are exposed to the outer circumferential surface of the inner rotor core 21. In the present specification including the claims, a magnet of which N pole is exposed to the outer circumferential surface is referred to as an "N-pole magnet", and a magnet of which S pole is exposed to the outer circumferential surface is referred to as an "S-pole magnet". As mentioned above, the inner magnets 27 may be provided such that the N pole of one or a plurality of inner magnets 27 alternates with the S pole of one or a plurality of inner magnets 27 on the outer circumferential surface of the inner rotor 20. In other words, the inner magnets 27 may be installed such that one or more N-pole magnets 28 alternate with one or more S-pole magnets 29.

Even though the N-pole magnets and the S-pole magnets may be alternating in a row, the inner magnet insertion recesses 25 arranged in a column are provided with the inner magnets 27 of a same polarity.

In the exemplary embodiments shown in FIGS. 1-5, the inner magnets 27 are inserted into all the inner magnet insertion recesses 25. In the example shown in the drawings, every three inner N-pole magnets 28 alternate with a single inner S-pole magnet 29 in a certain row of the inner magnet insertion recesses 25. The inner rotor 20 may be assembled in a manner similar to an assembly of tessellating pieces onto a puzzle board in a tiling puzzle. Here, the inner rotor core 21 may correspond to the puzzle board, the inner magnet insertion recesses 25 may correspond to piece marks of the puzzle board, and the inner magnets 27 may correspond to the pieces. That is, the inner rotor 20 may be manufactured by forming the inner magnet insertion recesses 25 on the inner rotor core 21 and inserting the inner magnets 27 into the inner magnet insertion recesses 25. The specification of the magnetic coupling 100 can be adjusted by changing the number and arrangement of the inner magnets 27 installed in the inner rotor core 21.

Though the inner magnets 27 are inserted into all the inner magnet insertion recesses 25 and every three inner N-pole magnets 28 alternate with a single inner S-pole magnet 29 circumferentially in the embodiment described above, the present disclosure is not limited thereto. For example, the inner magnets 27 may be arranged in various ways as shown in FIGS. 5-7 according to the specification required in the application of the magnetic coupling 100.

Figure 5:
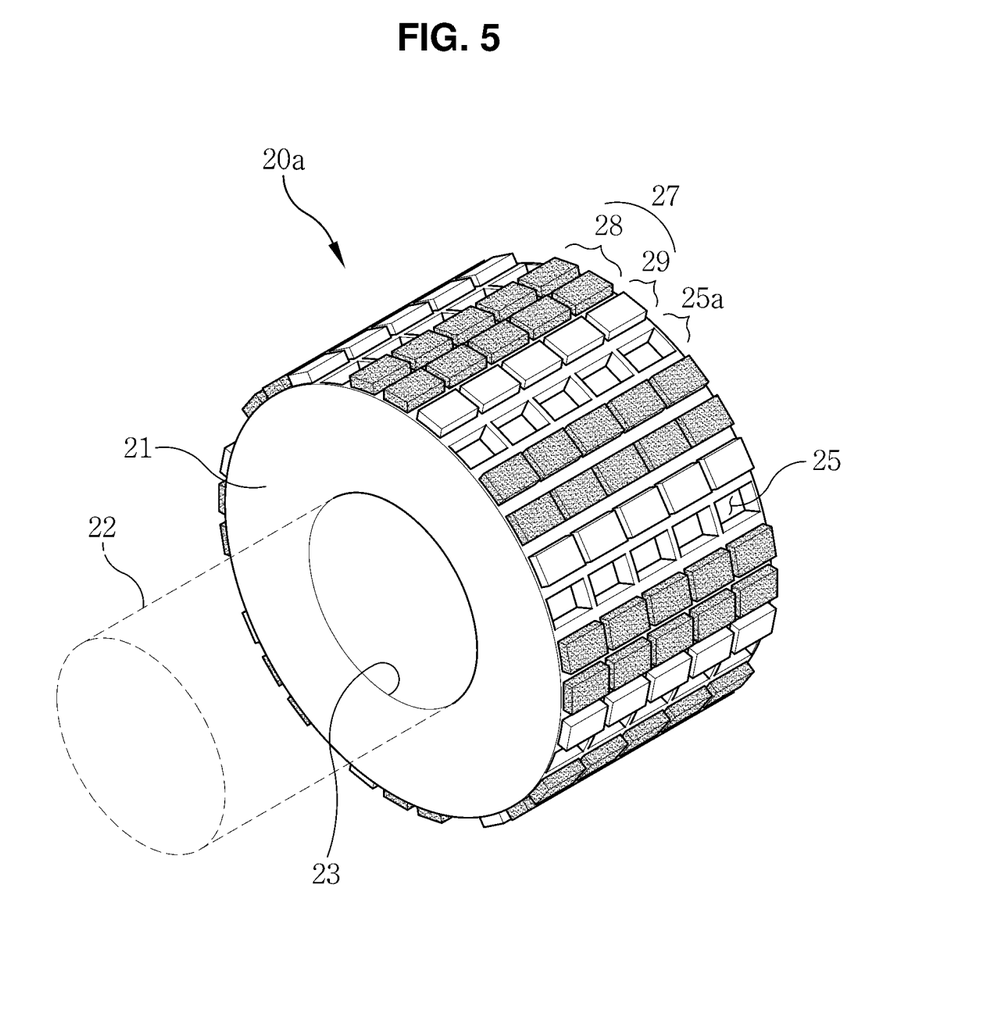
FIGS. 5 to 7 are perspective views of the inner rotors having different inner magnet arrangements according to another exemplary embodiments of the present disclosure.
Figure 6:
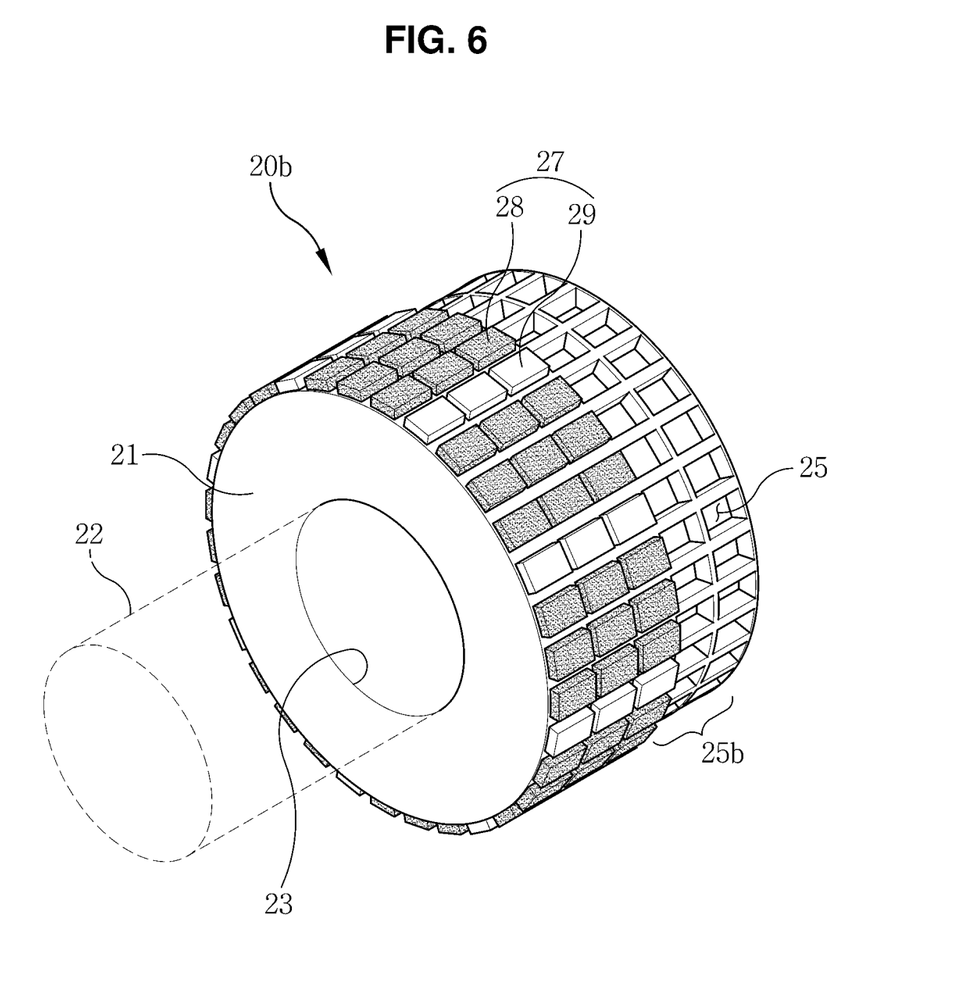
Figure 7:
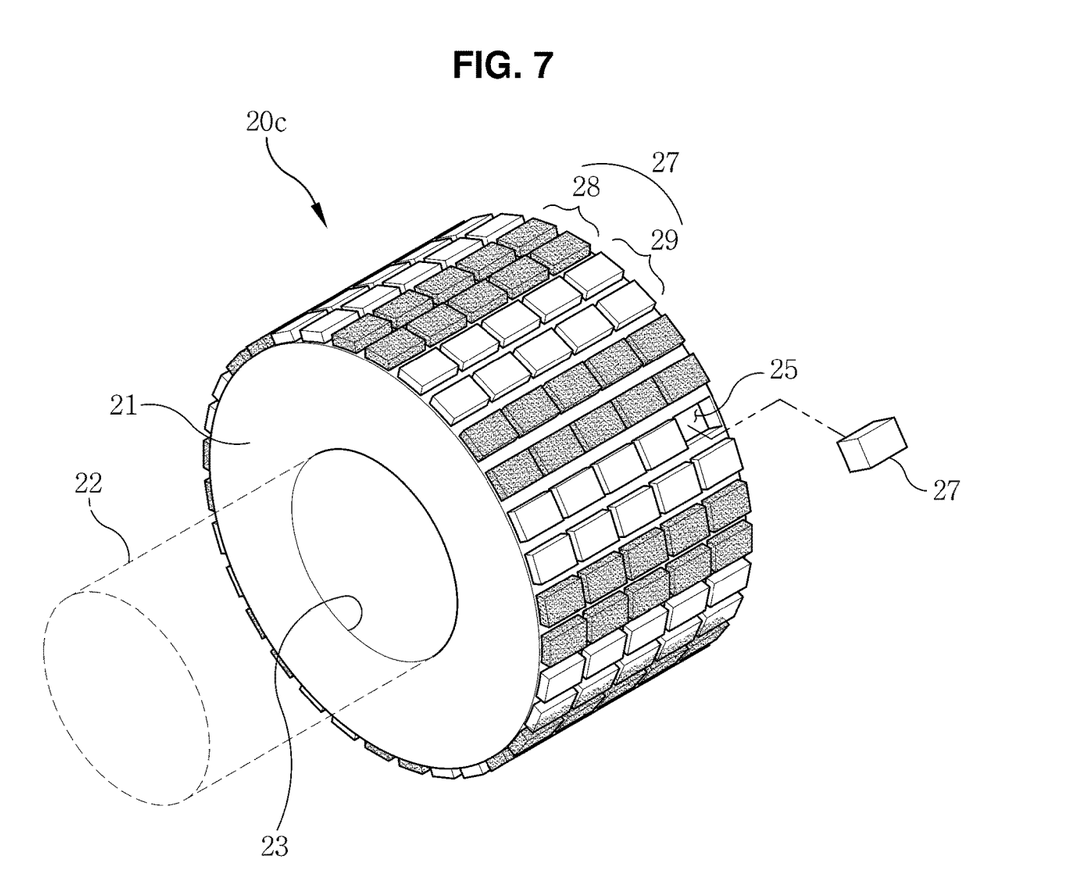

FIGS. 5-7 are perspective views of the inner rotors 20a-20c having different inner magnet arrangements according to another exemplary embodiments.

Referring to FIG. 5, the inner magnets 27 may be arranged on the inner rotor 20a such that every two inner N-pole magnets 28 alternate with a single inner S-pole magnet 29 and a vacant position in a circumferential direction. That is, a combination of two inner N-pole magnets 28 and a single inner S-pole magnet 29 is repeatedly arranged, and one inner magnet insertion recess 25a where no inner magnet 27 is inserted is located between the combinations.

In the example of FIG. 6, the inner magnets 27 are arranged such that every three inner N-pole magnets 28 alternate with a single inner S-pole magnet 29 in the circumferential direction. Also, the inner rotor 20b includes a series of vacant positions arranged in the circumferential direction. That is, the inner rotor 20b includes one or more rows of vacant positions where no inner magnet 27 is inserted. In the embodiment of FIG. 6, the inner rotor 20b includes five rows of the inner magnet insertion recesses 25. Among the five rows of the inner magnet insertion recesses 25, three rows are filled with the inner magnets 27 while the remaining two rows of the insertion recesses 25b are vacant.

In the example of FIG. 7, the inner magnets 27 are inserted into all the inner magnet insertion recesses 25 on the inner rotor 20c. The inner magnets 27 are arranged such that every two inner N-pole magnets 28 alternate with two inner S-pole magnet 29 in the circumferential direction. That is, the same number of inner N-pole magnets 28 and the inner S-pole magnets 29 are alternately arranged on the inner rotor 20c.

In another embodiment, the inner rotor may have an arrangement of the inner magnets 27 reverse to that shown in FIG. 4. That is, the inner magnets 27 are may be inserted into all the inner magnet insertion recesses 25 on the inner rotor 20c, and the inner magnets 27 may be arranged such that every three inner S-pole magnets 29 alternate with a single inner N-pole magnet 28 in the circumferential direction.

As described above, the inner rotor cores 20-20c according to exemplary embodiments have the inner magnet insertion recesses 25 formed in the two-dimensional array having m rows and n columns. The arrangement of the inner magnets 27 including the arrangement of the vacant row or the vacant column and the alternating pattern of the column of the inner N-pole magnets 28 and the column of the inner S-pole magnets 29 may be adjusted as necessary. The specification required for the magnetic coupling 100 can be met by adjusting the arrangement of the inner magnets 27.

Figure 8:
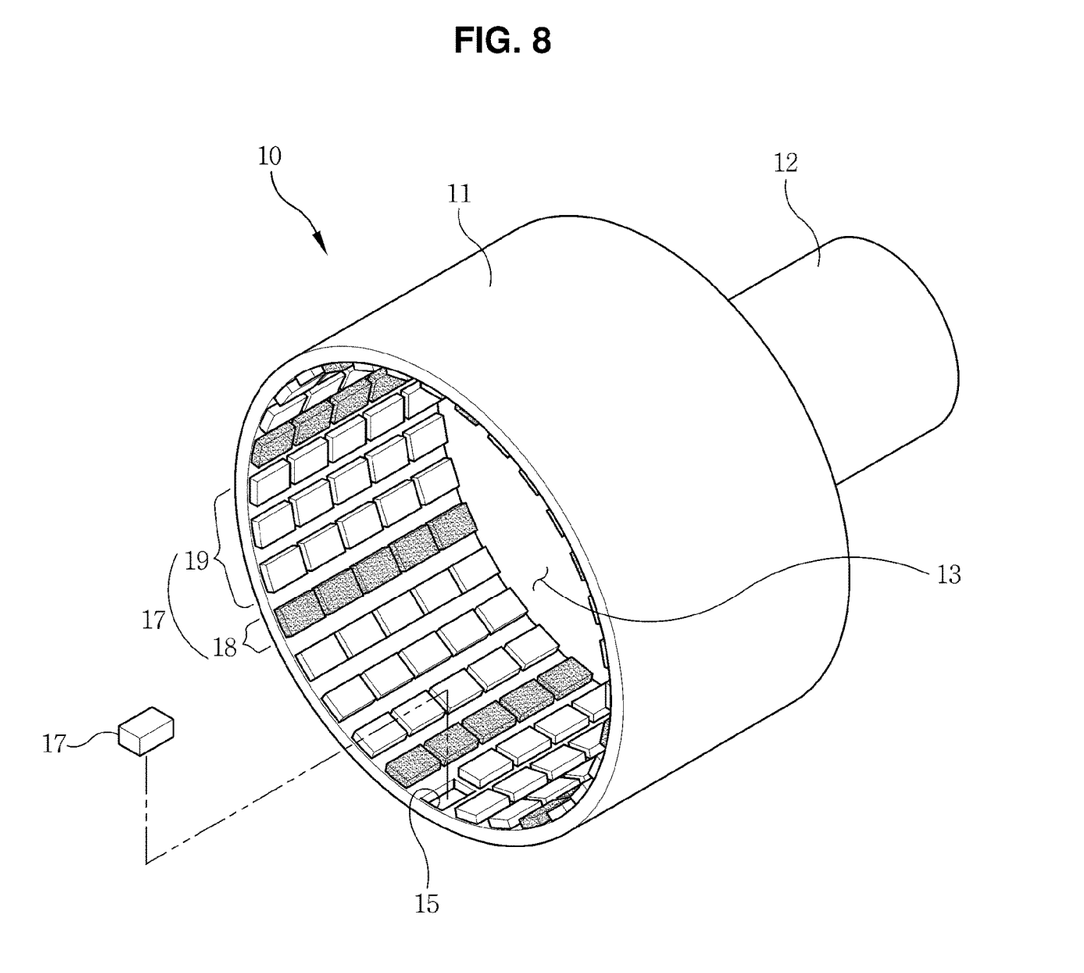
FIG. 8 is a perspective view of an outer rotor shown in FIG. 1.

Now, the outer rotor 10 according to the present embodiment will be described in detail with reference to FIGS. 1, 2, and 8. FIG. 8 is a perspective view of the outer rotor 10 shown in FIG. 1.

The outer rotor 10 includes an outer rotor core 11, an outer rotation shaft 12, and a plurality of outer magnets 17. The outer rotor core 11 has a cylindrical shape with an opening formed on one side and is closed by an end plate on the other side. The cylindrical side wall and the end plate of the outer rotor core 11 define the cavity 13 for receiving the inner rotor 20. The opening of the outer rotor core 11 serves as an entrance of the cavity 13 and allows the inner rotor 20 to be inserted into the cavity 13. The outer rotation shaft 12 extends axially in the direction opposite to the cavity 13 from a center of an outer surface of the end plate of the outer rotor core 11.

The outer rotor core 11 has the outer magnet insertion recesses 15 formed in a two-dimensional array having x rows and y columns, where x and y are natural numbers larger than 3 and y is larger than x, on an entire inner circumferential surface of the cavity 13. The plurality of outer magnets 17 are installed in at least some of the outer magnet insertion recesses 15 such that the N pole of one or a plurality of outer magnets 17 alternates with the S pole of one or a plurality of outer magnets 27.

As mentioned above, the outer magnet insertion recesses 15 are formed on the entire inner circumferential surface of the outer rotor core 11. The outer magnet insertion recesses 15 may have rectangular cross sections in the longitudinal and the transverse directions, for example. Each of the outer magnet insertion recesses 15 may be formed to face a corresponding one of the inner magnet insertion recesses 25.

The outer magnet insertion recesses 15 in a column are arranged in a direction parallel to the rotational axis of the outer rotor 10. The outer magnet insertion recesses 15 in a row are arranged in a circumference of which plane is orthogonal with respect to the rotational axis of the outer rotor 10.

The outer magnets 17 are magnetized in the radial direction. Some of the outer magnets 17 may be disposed such that their N poles are exposed to the inner circumferential surface of the outer rotor core 11, while the other outer magnets 17 may be disposed such that their S poles are exposed to the inner circumferential surface of the outer rotor core 11. The outer magnets 17 may be provided such that the N pole of one or a plurality of outer magnets 17 alternates with the S pole of one or a plurality of outer magnets 17 on the inner circumferential surface of the outer rotor core 11. In other words, the outer magnets 17 may be installed such that one or more outer N-pole magnets 18 alternate with one or more outer S-pole magnets 19.

Even though the N-pole magnets and the S-pole magnets may be alternating in a row, the outer magnet insertion recesses 15 arranged in a column are provided with the outer magnets 17 of a same polarity. For each of the outer magnet insertion recesses 15, the polarity of the outer magnet 17 may be chosen to be opposite to that of the inner magnet 27 facing the outer magnet 17 so that an attraction force acts between the outer magnet 17 and the inner magnet 27. For example, in the exemplary embodiment shown in FIGS. 1-4 where every three inner N-pole magnets 28 alternate with a single inner S-pole magnet 29 in a row, the outer magnets 17 may be provided such that every three outer S-pole magnets 19 alternate with a single outer N-pole magnet 18 in the row.

As a result, the magnetic coupling 100 according to the present embodiment can transfer torque received by one of the outer rotation shaft 12 and the inner rotation shaft 22 separated from each other to the other one of the outer rotation shaft 12 and the inner rotation shaft 22 by a magnetic force between the outer magnet 17 and the inner magnet 27.

Meanwhile, even though the magnet insertion recesses 15 and 25 for inserting the magnets 17 and 27, respectively, are formed on both the outer rotor 10 and the inner rotor 20 in the embodiment described above, the present disclosure is not limited thereto. For example, the magnet insertion recesses may be formed on either the outer rotor 10 or the inner rotor 20.

The outer magnets provided in the outer rotor may have the same shape as each other. Also, the inner magnets provided in the inner rotor may have the same shape as each other. Further, the outer magnet and the inner magnet may have the same shape as each other. Alternatively, however, the outer magnet and the inner magnet may have different shapes from each other.

The description of the disclosure is exemplary in nature and, thus, variations that do not depart from the substance of the disclosure are intended to be within the scope of the disclosure. Such variations are not to be regarded as a departure from the spirit and scope of the disclosure.

What is claimed is:

1. An inner rotor for use in a magnetic coupling, comprising:
   an inner rotor core having inner magnet insertion recesses formed in a two-dimensional array having m rows and n columns on an entire outer circumferential surface, where m and n are natural numbers larger than 3 and n is larger than m;
   an inner rotation shaft coupled to a center of an end face of the inner rotor core; and
   a plurality of inner magnets magnetized in a radial direction and each being installed in at least some portions of the inner magnet insertion recesses such that a first number of magnetic north (N) poles of the plurality of inner magnets alternates with a second number of magnetic south (S) poles of the plurality of inner magnets, and the first number is different from the second number.

2. The inner rotor of claim 1, wherein each of the inner magnet insertion recesses has rectangular cross sections in longitudinal and transverse directions.

3. The inner rotor of claim 1, wherein the inner magnet insertion recesses in a column are arranged in a direction parallel to a rotational axis of the inner rotor,
   wherein the inner magnet insertion recesses in a row are arranged in a circumference of which plane is orthogonal with respect to the rotational axis of the inner rotor.

4. The inner rotor of claim 3, wherein the inner magnet insertion recesses arranged in a column are provided with the inner magnets of a same polarity.

5. An outer rotor for use in a magnetic coupling, comprising:
   an outer rotor core having a cavity for receiving an inner rotor and outer magnet insertion recesses formed in a two-dimensional array having x rows and y columns on an entire inner circumferential surface, where x and y are natural numbers larger than 3 and y is larger than x;
   an outer rotation shaft coupled to the outer rotor core and extending axially in a direction opposite to the cavity; and
   a plurality of outer magnets magnetized in a radial direction and each being installed in respective one of at least some of the outer magnet insertion recesses such that the N pole of one or more of the plurality of outer magnets alternates with the S pole of one or more of the plurality of outer magnets.

6. The outer rotor of claim 5, wherein the outer magnet insertion recesses in a column are arranged in a direction parallel to a rotational axis of the outer rotor,
wherein the outer magnet insertion recesses in a row are arranged in a circumference of which plane is orthogonal with respect to the rotational axis of the outer rotor.

7. The outer rotor of claim 6, wherein the outer magnet insertion recesses arranged in a column are provided with the outer magnets of a same polarity.

8. A magnetic coupling comprising:
an outer rotor having a cavity for receiving an inner rotor and an inner circumferential surface on which a plurality outer magnets are installed; and
the inner rotor placed in the cavity of the outer rotor and having an outer circumferential surface on which a plurality inner magnets are installed,
wherein the inner rotor comprises:
an inner rotor core having inner magnet insertion recesses formed in a two-dimensional array having m rows and n columns on the outer circumferential surface, where m and n are natural numbers larger than 3 and n is larger than m;
an inner rotation shaft coupled to a center of an end face of the inner rotor core; and
the plurality of inner magnets magnetized in a radial direction and each being installed in respective one of at least some of the inner magnet insertion recesses such that a magnetic north (N) pole of one or more of the plurality of inner magnets alternates with a magnetic south (S) pole of one or more of the plurality of inner magnets.

9. The magnetic coupling of claim 8, wherein the outer rotor comprises:
an outer rotor core having the cavity for receiving the inner rotor and outer magnet insertion recesses formed in a two-dimensional array having x rows and y columns on an inner circumferential surface, where x and y are natural numbers larger than 3 and y is larger than x;
an outer rotation shaft coupled to the outer rotor core and extending axially in a direction opposite to the cavity; and
the plurality of outer magnets magnetized in a radial direction and each being installed in respective one of at least some of the outer magnet insertion recesses such that the N pole of one or more of the plurality of outer magnets alternates with the S pole of one or more of the plurality of outer magnets.

* * * * *